United States Patent
Edpalm et al.

(10) Patent No.: US 12,464,141 B2
(45) Date of Patent: Nov. 4, 2025

(54) VIDEO STREAM OVERLAY ENCODING USING NO-DISPLAY FRAMES AND MOTION VECTORS CALCULATED BASED ON KNOWN POSITION-DIFFERENCES BETWEEN FRAMES

(71) Applicant: Axis AB, Lund (SE)

(72) Inventors: Viktor Edpalm, Lund (SE); Song Yuan, Lund (SE)

(73) Assignee: Axis AB, Lund (SE)

( * ) Notice: Subject to any disclaimer, the term of this patent is extended or adjusted under 35 U.S.C. 154(b) by 189 days.

(21) Appl. No.: 18/164,069

(22) Filed: Feb. 3, 2023

(65) Prior Publication Data
US 2023/0262238 A1 Aug. 17, 2023

(30) Foreign Application Priority Data
Feb. 17, 2022 (EP) .................................. 22157291

(51) Int. Cl.
*H04N 19/184* (2014.01)
*H04N 19/172* (2014.01)
*H04N 19/176* (2014.01)
*H04N 19/187* (2014.01)
*H04N 19/51* (2014.01)

(52) U.S. Cl.
CPC ......... *H04N 19/184* (2014.11); *H04N 19/172* (2014.11); *H04N 19/176* (2014.11); *H04N 19/187* (2014.11); *H04N 19/51* (2014.11)

(58) Field of Classification Search
None
See application file for complete search history.

(56) References Cited

U.S. PATENT DOCUMENTS

| 8,630,346 B2 | 1/2014 | Chappalli et al. |
| 10,223,593 B1 * | 3/2019 | Taylor ..................... G10L 15/02 |
| 2014/0118545 A1 | 5/2014 | Iwasaki |
| 2014/0270513 A1 * | 9/2014 | Sakamoto ............ H04N 19/436 382/166 |
| 2017/0272771 A1 | 9/2017 | Edpalm |

(Continued)

FOREIGN PATENT DOCUMENTS

JP  2007-228101 A  9/2007

OTHER PUBLICATIONS

Extended European Search Report dated Aug. 5, 2022 for European Patent Application No. 22157291.0.

*Primary Examiner* — Edemio Navas, Jr.
(74) *Attorney, Agent, or Firm* — Volpe Koenig

(57) ABSTRACT

A method of encoding a video stream including an overlay is provided, including: capturing a first image; adding an overlay to the first image at a first position, and encoding the first image in a first frame of a video stream; capturing a second image of the scene; determining a desired position of the overlay in the second image; encoding the second image in a second frame marked as a no-display frame, and generating and encoding a third frame including temporally predicted macroblocks at the desired position of the overlay referencing the first frame with motion vectors based on a difference between the desired position and the first position, and skip-macroblocks outside of the desired position of the overlay referencing the first frame. A corresponding device, computer program and computer program product are also provided.

10 Claims, 7 Drawing Sheets

(56) References Cited

U.S. PATENT DOCUMENTS

| | | | |
|---|---|---|---|
| 2020/0007883 A1* | 1/2020 | Toresson | H04N 19/167 |
| 2020/0154131 A1 | 5/2020 | Iyer et al. | |
| 2021/0092378 A1 | 3/2021 | Zhang et al. | |
| 2021/0092387 A1 | 3/2021 | Edpalm et al. | |
| 2021/0337158 A1 | 10/2021 | Keskikangas et al. | |

* cited by examiner

VIDEO STREAM OVERLAY ENCODING USING NO-DISPLAY FRAMES AND MOTION VECTORS CALCULATED BASED ON KNOWN POSITION-DIFFERENCES BETWEEN FRAMES

FIELD OF INVENTION

The present disclosure relates to the field of video encoding. More in particular, the present disclosure relates to encoding of video streams including one or more overlays (such as used in e.g., augmented reality applications).

TECHNICAL BACKGROUND

Emerging technologies such as augmented reality (AR) attempt to enhance the experience of a user when viewing the world through a camera. This may include overlaying the captured images of a video stream with e.g., text or other graphics in order to provide more information to the user about what exactly it is the user is currently viewing. As one of many examples made available by such technologies, in a video stream depicting e.g., a street and various buildings, overlays may be added showing e.g., the address of a particular building, and/or for example the owner of the building or similar. This may help the user when trying to for example navigate the street, as the user may then learn about the various buildings by filming the street using a camera.

An overlay is generated and rendered over a captured image of the video stream. The overlay may for example be associated with a particular building, person, tourist attraction, or other object, found within a scene currently captured by the video stream. In real-life situations, if the camera used to capture the scene is moved, and/or if e.g., the field-of-view (FOV) of the camera changes, the position of the overlay is updated such that when the next captured image of the video stream is processed, the overlay is re-rendered such that it stays fixed with respect to the scene itself if the object is stationary. Other reasons for moving the overlay may for example be that the associated object is itself non-stationary (and moving) in the scene.

However, if the camera is simultaneously occupied with performing other tasks (such as detection and tracking of objects, encoding of the video stream, or other processing needed to generate an output video stream), the processing power (in terms of e.g., CPU, GPU and/or memory) required to generate and re-render the overlay each time e.g., the camera changes and/or the object moves may not always be available, and the re-generation and -rendering of the overlay may thus not be finished in time for when the next image in the video stream is supposed to be displayed/encoded. This may lead to issues with synchronization in the video stream, causing stuttering or for example that an overlay disappears and reappears between one frame and the next. In addition, as overlays often contain sharpened details due to the presence of e.g., text or other graphics, too frequent (re-)generation and (re-)rendering of such overlays may increase the overhead for the circuitry and software responsible for encoding the video stream and for controlling e.g., a bitrate of the generated output video stream. If the overlay is a privacy mask, the risk of the privacy mask disappearing in one or more frames may further not be tolerated at all. There is therefore a need to better handle the (re-)generation and (re-)rendering of overlays in a video stream when a computational power budget is limited.

SUMMARY

To at least partially overcome the above-mentioned issues, and to at least partially satisfy the above-mentioned need, the present disclosure provides an improved method of encoding a video stream including an overlay, as well as an improved device, computer program and computer program product, as defined by the accompanying independent claims. Various embodiments of the improved method, device, computer program and computer program product are defined in the accompanying dependent claims.

According to a first aspect, there is provided a method of encoding a video stream including an overlay. The method includes: a) capturing a first image of a scene. The method includes: b) adding an overlay to the first image at a first position, and encoding the first image as part of a first frame of an encoded video stream. The method includes: c) capturing a second image of the scene. The method includes: d) determining a desired position of the overlay in the second image, the desired position of the overlay in the second image being different from the first position of the overlay in the first image. The method further includes: e) encoding the second image as part of a second frame of the video stream, including marking the second frame as a no-display frame. The method further includes: f) generating (using e.g., software, without receiving a corresponding third image of the scene) and encoding a third frame of the video stream, including one or more macroblocks at the desired position of the overlay (in the second image) being temporally predicted macroblocks referencing the first frame and with one or more motion vectors based on a difference between the first position of the overlay in the first image and the desired position of the overlay in the second image, and including one or more macroblocks of the third frame outside of the desired position of the overlay (in the second image) being skip-macroblocks referencing the second frame of the video stream.

As discussed earlier herein, an overlay may for example include text or other graphics which are rendered on top of an image, such that, in the resulting frame encoding the image, the overlay may provide additional information about e.g., an object in a scene captured in the video stream.

As used herein, "temporally predicted macroblocks" are macroblocks (i.e., blocks of pixels in an image, such as e.g., blocks of 8×8 pixels, 16×16 pixels, or similar) which form part of temporally predicted frames, and for which macroblocks the information required to render the pixels are to be found based on the same (or other pixels) in other frames of the video stream. Such frames may also be referred to as inter-frames, predictive frames, differential frames, or e.g., P-frames or B-frames depending on whether they contain references to only previously encoded frames or also to future frames. Phrased differently, the meaning of the term "temporally predicted macroblock" does not deviate from that in already established standards of video coding, and serves to illustrate that frames including such macroblocks make use of temporally redundant information during encoding (i.e., such that information needed to render a frame does not need to be contained fully in the encoded frame itself, but may instead be found in, or at least approximated from, information found in one or more previous, or even future, frames). As used herein, "skip-macroblocks" (or SKIP macroblocks, skipped macroblocks, or similar) also has their standardized meaning, and are to be understood as any macroblocks which contain references to macroblocks found at a same position in a previous frame (or in a future frame), such that image data may be directly copied from the previous (or future) frame (without requiring any motion vectors) and not be included as part of the presently encoded frame itself. Finally, a "no-display frame" is to be understood as a frame which is in any way flagged to instruct the decoder that the frame is not to be rendered as part of a decoded video stream, but that the frame is still available such that information may be obtained from it and used for the decoding of one or more other frames which are to be displayed (i.e., not marked as no-display frames). The first frame may for example be an intra-predicted frame which include all data necessary to decode and render the frame, without relying on any reference to one or more previous or future frames. Such a frame may also be referred to as an intra-frame (I-frame) or a full frame, or similar. The first frame, the second frame and the third frame may for example form part of a so-called Group of Pictures (GOP), wherein an intra-frame (the first frame) is followed by one or more temporally predicted frames or frames containing references to one or other frames (such as frames containing one or more skip-macroblocks). Other sequences are of course also possible, as long as there is something equivalent to the first frame from which the third frame may obtain its image data for areas including the overlay, and as long as there is the second frame which is not displayed but only used as a source of image data for the third frame for areas not including the overlay.

It is envisaged that any video coding standard which supports the above concepts of temporally predicted macroblocks, skip-macroblocks, no-display frames and motion vectors may be used to realize the disclosed method. Examples of such standards include (but are not necessarily limited to): High Efficiency Video Coding (HEVC) H.265, Advanced Video Coding (AVC) H.264, VP8, VP9, AV1, and Versatile Video Coding (VVC) H.266.

The present disclosure improves upon currently available technology in that it allows to render an overlay with little overhead cost and where the risk of not being able to finish rendering the frame before the next frame is due is reduced or even eliminated. This is achieved by not performing a full re-rendering of a frame once the position of the overlay in the image changes, but to instead re-use image data related to the overlay from a previous frame, and to provide image data related to parts of the scene not including the overlay from a no-display frame generated for this purpose. As the present disclosure relies on already available and standardized types of frames only, it allows the encoder to encode as normal and to construct and insert the third frame using software. Likewise, any standard-compliant decoder may operate as normal without any special considerations being required in order to successfully render the video of the scene and overlay to a user. The motion vector(s) may be set using the encoder, which may take advantage of hardware acceleration to further reduce the required computational time.

In some embodiments of the method, the difference between the first position of the overlay in the first image and the desired position of the overlay in the second image may at least partially result from a change of a field-of-view (FOV, of a camera) between capturing the first image and the second image. The camera used to capture the scene may for example be a so-called pan-tilt-zoom (PTZ) camera, and the FOV may change e.g., by the camera zooming in or out, or even tilting or moving (panning).

In some embodiments of the method, the difference between the first position of the overlay in the first image and the desired position of the overlay in the second image may at least partially result from a change in position of an object with which the overlay is associated in the scene. The overlay may for example be associated with a person in a scene, and the method as described herein may be used to re-render the overlay in an efficient way if the person is moving in the scene.

In some embodiments of the method, the third frame may be a predicted frame (a P-frame, containing references only to itself and/or to one or more previous frames in a sequence of frames), or be a bi-directional predicted frame (a B-frame, containing reference to e.g., itself and/or to one or more previous frames, but also optionally also, or instead, to one or more future frames in the sequence). The third frame may be inserted after the second frame in the encoded video stream, such that the third frame refers back to the second frame.

In some embodiments of the method, the third frame may be a B-frame and inserted before the second frame in the encoded video stream, such that the third frame refers forward to the second frame.

In some embodiments of the method, the first image and the second image may be captured using a same camera. In other embodiments, it may be envisaged to capture the first image using one camera, and to capture the second image using another, second camera (in for example a camera arrangement configured to provide a panoramic image of the scene).

In some embodiments of the method, the overlay may be an augmented reality (AR) overlay.

In some embodiments of the method, the method may be performed in a camera used to capture the first image and/or the second image. The camera may for example be a monitoring camera (such as a surveillance camera or similar). In other embodiments, the method may be performed in a camera system including such a camera, but not necessarily in the camera itself but instead in e.g., a video processing server or similar).

In some embodiments of the method, the overlay may be fixed relative to the scene. For example, the overlay may be associated with an object in the scene which does not move, such as a building, street, or other types of immobile, stationary structures.

In some embodiments of the method, the method may include estimating a computational time needed to (instead) render/add and encode the overlay as part of the second image and second frame. If it is determined that this needed computational time is below a threshold value, the method may instead skip the step of generating the third frame, and instead add the overlay to the second image at the desired position, and encode the second image as part of a second frame of the video stream. This method may skip marking the second frame as a no-display frame, such that the second frame may be rendered after the first frame. This embodiment is advantageous in that if sufficient computational power is available (that is, if the threshold against which the estimate above is based on the available computational resources), the overlay may instead be re-rendered directly. This may e.g., provide an improved quality as e.g., a change in for example perspective of the scene between capturing the first image and the second image will also be taken into account when rendering the overlay.

According to a second aspect of the present disclosure, a device for encoding a video stream including an overlay is provided. The device includes a processor and a memory. The memory stores instructions that, when executed by the processor, cause the device to: capture a first image of a scene; to add an overlay to the first image at a first position, and to encode the first image as part of a first frame of an encoded video stream; to capture a second image of the scene; to determine a desired position of the overlay in the second image, where the desired position of the overlay in the second image is different from the first position of the overlay in the first image; to encode the second image as part of a second frame of the video stream, including marking the second frame as a no-display frame; and to generate and encode a third frame of the video stream (using e.g., software), wherein one or more macroblocks of the third frame at the desired position of the overlay are temporally predicted macroblocks referencing the first frame and with motion vectors based on a difference between the first position of the overlay (in the first image) and the desired position of the overlay (in the second image), and where one or more macroblocks of the third frame outside of the desired position of the overlay (in the second image) are skip-macroblocks referencing the second frame of the (encoded) video stream.

The device according to the second aspect is thus configured to perform the corresponding steps of the method of the first aspect.

In some embodiments of the device, the device is further configured (i.e., the instructions are such that they when executed by the processor cause the device) to perform any of the embodiments of the method described herein.

In some embodiments of the device, the device is a monitoring camera. The monitoring camera may be configured to capture at least one of the first image and the second image.

According to a third aspect of the present disclosure, a computer program for encoding a video stream including an overlay is provided. The computer program is configured to cause, when executed by a processor of a device (such as the device according to the second aspect), cause the device to: capture a first image of a scene; to add an overlay to the first image at a first position, and to encode the first image as part of a first frame of an encoded video stream; to capture a second image of the scene; to determine a desired position of the overlay in the second image, where the desired position of the overlay in the second image is different from the first position of the overlay in the first image; to encode the second image as part of a second frame of the video stream, including marking the second frame as a no-display frame; and to generate and encode a third frame of the video stream (using e.g., software), wherein one or more macroblocks of the third frame at the desired position of the overlay are temporally predicted macroblocks referencing the first frame and with motion vectors based on a difference between the first position of the overlay (in the first image) and the desired position of the overlay (in the second image), and where one or more macroblocks of the third frame outside of the desired position of the overlay (in the second image) are skip-macroblocks referencing the second frame of the (encoded) video stream.

The computer program is thus configured to cause the device to perform a method as described earlier herein, according to the first aspect.

In some embodiments, the computer program is further configured to (when executed by the processor of the device) cause the device to perform any embodiment of the method as described herein.

According to a fourth aspect, a computer program product is provided, including a computer readable storage medium which stores a computer program as according to the third aspect or any embodiments thereof. The computer readable storage medium may for example be non-transitory, and be provided as e.g., a hard disk drive (HDD), solid state drive (SDD), USB flash drive, SD card, CD/DVD, and/or as any other storage medium capable of non-transitory storage of data.

Other objects and advantages of the present disclosure will be apparent from the following detailed description, the drawings and the claims. Within the scope of the present disclosure, it is envisaged that all features and advantages described with reference to e.g., the method of the first aspect are relevant for, apply to, and may be used in combination with also any feature and advantage described with reference to the device of the second aspect, the computer program of the third aspect, and/or the computer program product of the fourth aspect, and vice versa.

BRIEF DESCRIPTION OF DRAWINGS

Exemplifying embodiments will now be described below with reference to the accompanying drawings, in which.

Figure 1A:
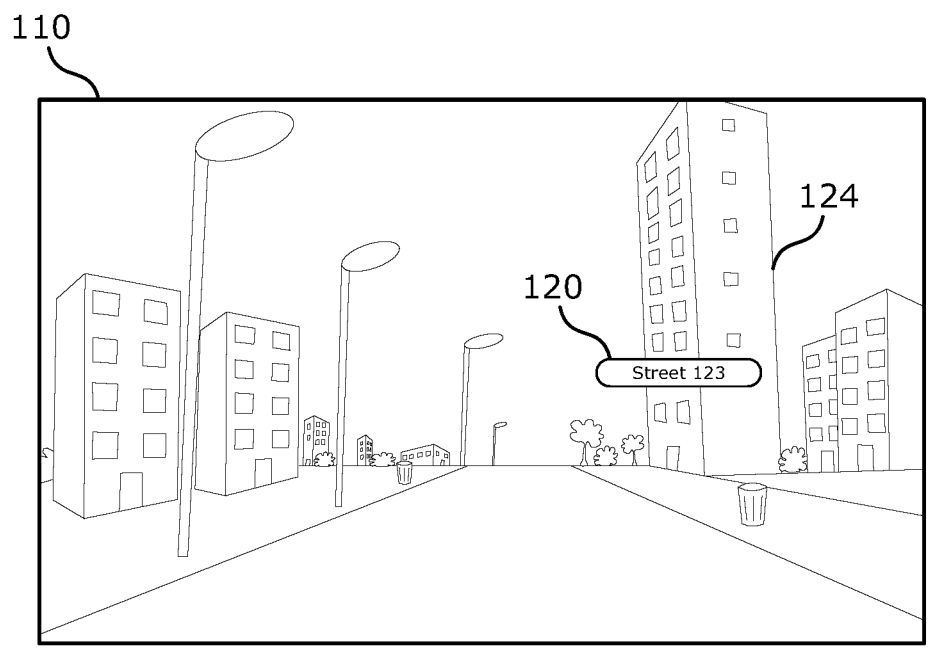
FIGS. 1A-1D schematically illustrate examples of how a method according to the present disclosure is used to encode a video stream including an overlay.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the Figures, the (absolute or relative) sizes of elements and regions may be exaggerated or understated vis-à-vis their true values for illustrative purposes and, thus, are provided to illustrate the general structures of the embodiments.

DETAILED DESCRIPTION

Various examples of how a method according to the present disclosure is used to encode a video stream including an overlay will now be described with reference to FIGS. 1A-1D. Reference is also made to FIG. 2A, which schematically illustrates a flowchart of steps S201-S206 of such a method 200.

Figure 1B:
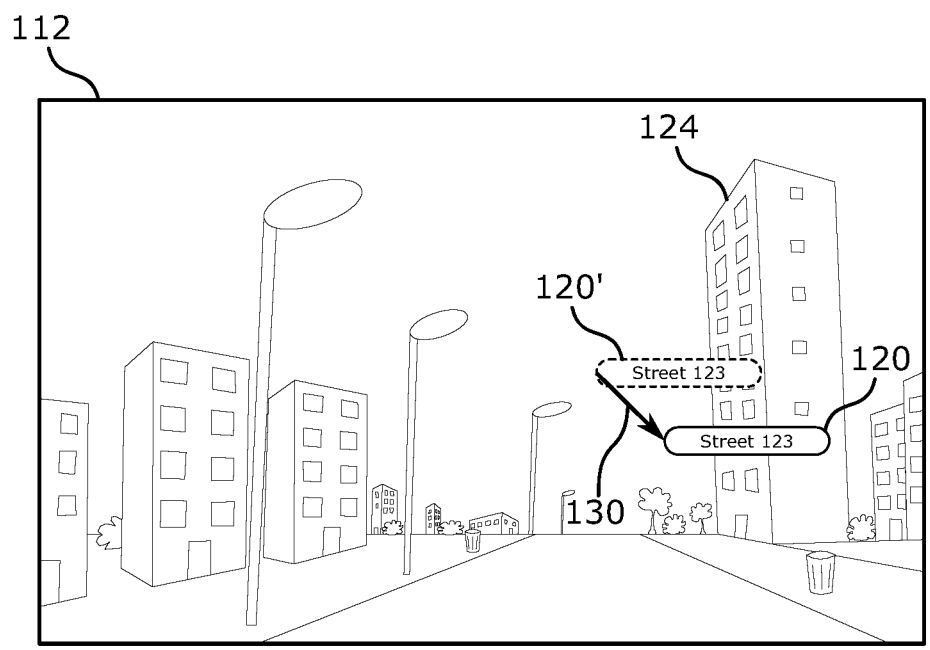
Figure 2A:
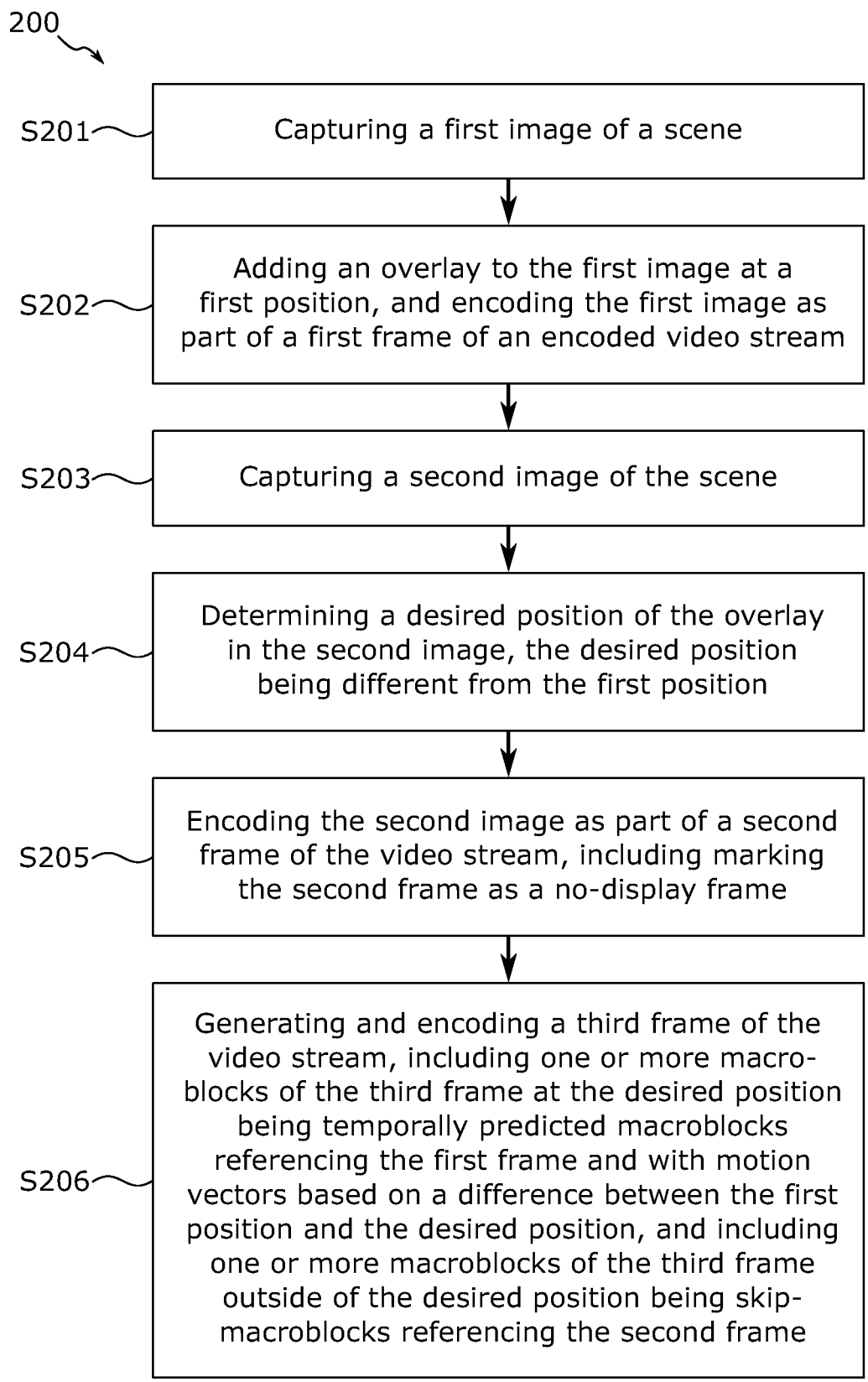
FIGS. 2A and 2B illustrate flowcharts of various embodiments of a method according to the present disclosure.

FIGS. 1A and 1B schematically illustrate a situation wherein the presently disclosed method can be used. FIG. 1A illustrates a captured first image 110. The first image 110 depicts a scene, here including a view of a street along which there are several buildings/houses as well as other objects such as trees, trash bins, lamp posts, etc., often found in such environments. Augmented reality is used to provide additional information to the user viewing the first image (as part of a video stream), including an overlay 120 which is added to present additional information about a particular building 124 in the scene. Here, this additional information includes the address ("Street 123") of the building 124. There may, of course, also be one or more additional overlays provided, indicating for example the addresses of the other buildings, the name of the street, a compass direction, an arrow indicating in which direction the user should move in order to arrive at a desired location, and many other types of overlays. It is assumed that the first image 110 has been captured using a camera having a particular field-of-view (FOV), including a particular alignment of the camera (in terms of e.g., yaw, pitch and roll) and a particular zoom-level, etc. The camera may for example be a body-camera worn by the user, a camera of a smartphone or tablet, a dashcam mounted in a vehicle which the user is currently driving, or e.g., a camera (such as a pan-tilt-zoom, PTZ, camera) mounted to e.g., a building (such as a monitoring or surveillance camera, etc.) Other alternatives are of course also possible, and all envisaged as being useable in the disclosed method.

FIG. 1B illustrates a captured second image 112 of the same scene, but wherein the positions of the objects in the scene are at different positions in the second image 112 than in the first image 110. This may be due to the camera having moved, being tilted, panned, zoomed, or similar. For example, it can be assumed that between capturing the first image 110 and the second image 112 of the scene, the camera has either moved backward along the street and to the left, and/or that the camera has zoomed out on the scene. Independent of which, in the second image 112, the particular building 124 is now found in a different position, which means that a desired position of the overlay 120 in the second image 112 is different from the position of the overlay in the first image 110 (here illustrated as the overlay 120'). Consequently, there is a need to re-render the overlay 120 in the second image 112 such that the overlay 120 appears to be fixed relative to the scene, and i.e., follows the position of the particular building 124 which the overlay 120 is supposed to provide additional information about. The desired movement of the overlay is illustrated by the array 130 in FIG. 1B.

As previously discussed, it may be such that the camera (or any other device responsible for encoding the video stream which the first image 110 and the second image 112 are supposed to form part of) is also occupied with one or many other tasks which occupy computational resources, and such that the resources left available for re-rendering of the overlay 120 in the second image 112 are not sufficient to finish such re-rendering in time (i.e., before processing should move to a subsequent third image captured after the second image 112, etc.). This may result in synchronization problems, stuttering or otherwise non-smooth transitioning to the second image in the video stream, and/or to e.g., the overlay disappearing from the second image due to not being completely rendered in time.

As will now be described with reference to FIGS. 1C and 1D (and FIG. 2A), the method as envisaged herein provides a solution for how to overcome such issues.

Figure 1C:
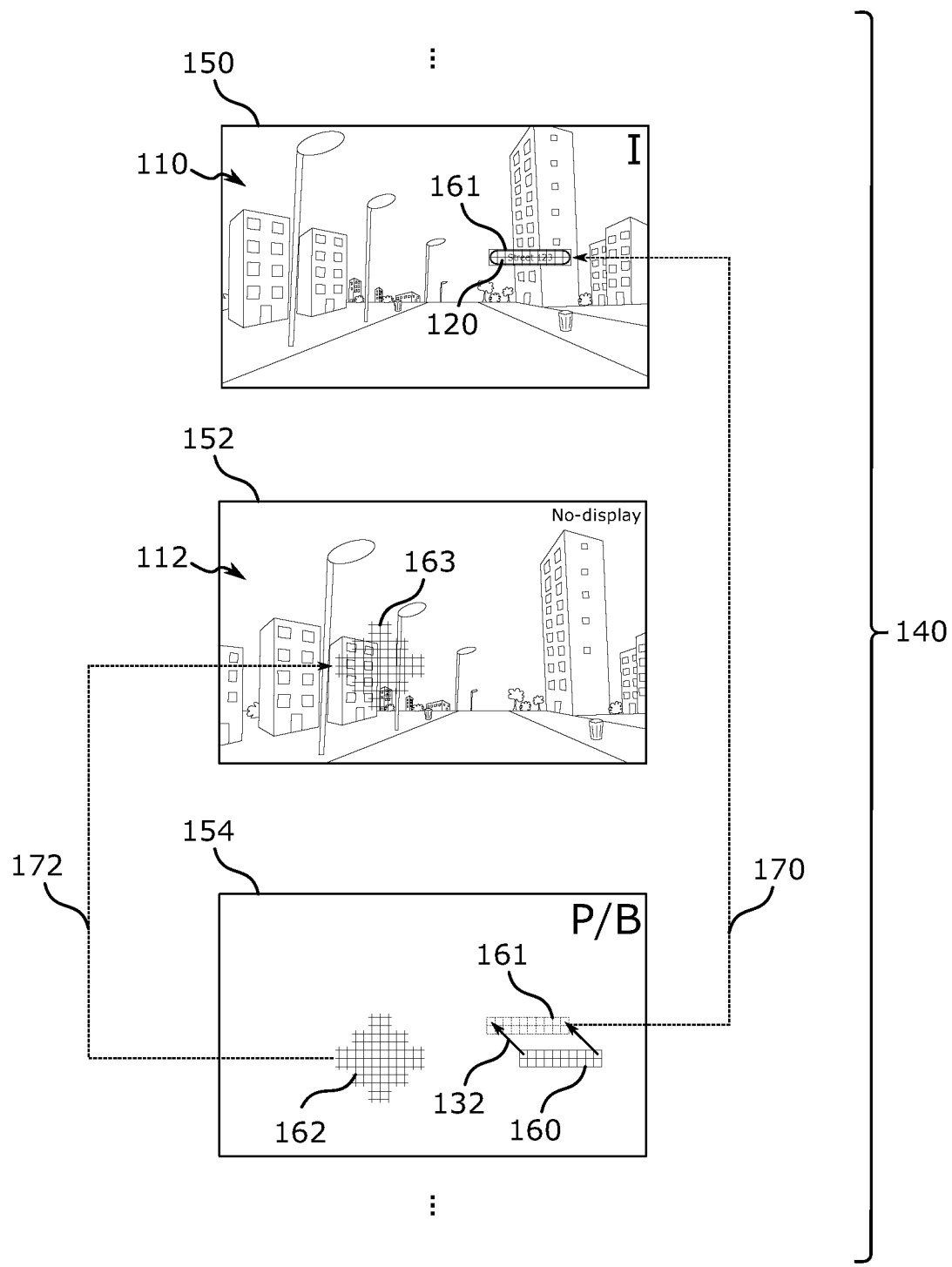

FIG. 1C schematically illustrates the creation of a sequence of frames 150, 152 and 154 of an encoded video stream 140, according to the envisaged method 200.

As described with reference to FIG. 1A, the method 200 first starts with capturing (in a step S201) the first image 110 of the scene, and then proceeds with adding (in a step S202) the overlay 120 to the first image 110 and encoding the first image 110 (and overlay 120) as part of a first frame 150 of the encoded video stream 140. In the first frame 150, the overlay 120 is at a first position within the first image 110, as measured e.g., using image coordinates. That the first image 110 is encoded "as part of" the first frame 150 means that there may of course also be other content provided in the first frame 150, such as e.g., additional graphics or text objects and similar in addition to the image information originating from the first image 110.

The method 200 then proceeds with capturing (in a step S203) the second image 112 of the same scene, but wherein, between capturing the first image 110 and the second image 112, the camera has changed such that a desired position of the overlay 120 in the second image 112 is now different from the position of the overlay 120 in the first image 110. In a step S204, the method 200 includes determining the desired position of the overlay 120 in the second image 112, where, as described above, the desired position of the overlay 120 in the second image 112 is different from that in the first image 110. The change in position is illustrated by the arrow 130 in FIG. 1B. The desired position in the second image may be found e.g., by knowing a movement of the camera, a change-of-zoom of the camera, or similar.

Instead of attempting to re-render the overlay on top of the second image 112, and to then encode the second image 112 and the overlay 120 together as e.g., a second frame of the encoded video stream 140, the method 200 instead proceeds with (in a step S205) encoding the second image 112 without the overlay 120, as part of a second frame 152 of the video stream 140 (where as before, "as part of" means that there may also be other content included in the second frame 152 than only the second image 112). In addition, the method 200 marks the second frame 152 as a so-called no-display frame, meaning that the second frame 152 is not to be rendered visible by a decoder receiving the encoded video stream 140. The second frame 152 may however still be used to contain information which may in turn be used by one or more other frames in the video stream 140.

After having encoded the second image 112 as part of the second frame 152, the method 200 then proceeds with (in a step S206) generating a third frame 154 of the video stream 140. The third frame 154 does not contain any captured image, but is instead such that it contains references 170 and 172 to one or more other frames in the video stream 140 as will now be described.

At the desired position of the overlay 120 in the second image 112, the third frame 154 includes one or more macroblocks 160 which are temporally predicted macroblocks. This means that these macroblocks do not contain any actual image data in the third frame 154, but instead contain a reference 170 to macroblocks 161 of the first image 110 and first frame 150 of the video stream 140. The macroblocks 161 of the first frame 150 to which the macroblocks 160 of the third frame 154 refer are at the position of the overlay 120 in the first image 110. To know where in the first image 110 and first frame 150 the decoder is supposed to look for these macroblocks 161, the third frame 154 also includes (e.g., encodes) one or more motion vectors 132. The motions vectors 132 are based on the difference between the position of the overlay 120 in the first image 110 and the desired position of the overlay 120 in the second image 112, as obtained in the previous step S205. The motion vectors 132 are for example opposite in direction and equal in length to the arrow 130 indicated in FIG. 1B, such that the decoder may know that the image data for the macroblocks 160 is to be found at the macroblocks 161 at the position of the overlay 120 in the first image 110.

The third frame 154 also includes one or more macroblocks 162 which are not at the desired position of the overlay 120 in the second image 112. These macroblocks 162 are so-called skip-macroblocks, and include one or more references 172 to macroblocks 163 at a same position in the second image 112 and second frame 152, such that the decoder knows that it should copy image information directly from the macroblocks 163 of the second image 112 and second frame 152 and use this information to create the corresponding parts of the third frame 154. Thus, the third frame 152 is provided with information sufficient to create an image (during decoding of the video stream 140) showing both the overlay 120 (where data for the overlay is obtained from the first image 110 and first frame 150) and areas not containing the overlay 120 (where data is instead obtained from the second image 112 and the second frame 152). When displaying the third frame 154 after decoding, the user can then see the updated view of the scene (required due to the movement of the camera), including the overlay 120 at the desired, correct position.

In the example described with reference to FIG. 1C, the first frame 150 is for example an intra-frame which does not make any reference to one or more other frames in the encoded video stream 140. The first frame 150 is for example a so-called I-frame, and is self-containing with respect to image data required to view the first image 110 after decoding the first frame 150. Also, in the example described with reference to FIG. 1C, the second (no-display) frame 152 is added after the first frame 150 but before the third frame 154. Thus, the third frame 154 has a reference 172 back in time to the second frame 152, and is for example a so-called P-frame. The first frame 150 may for example serve as a first frame in a GOP sequence of frames. There may be other frames subsequent to the third frame 154, and/or other frames preceding the first frame 150.

Figure 1D:
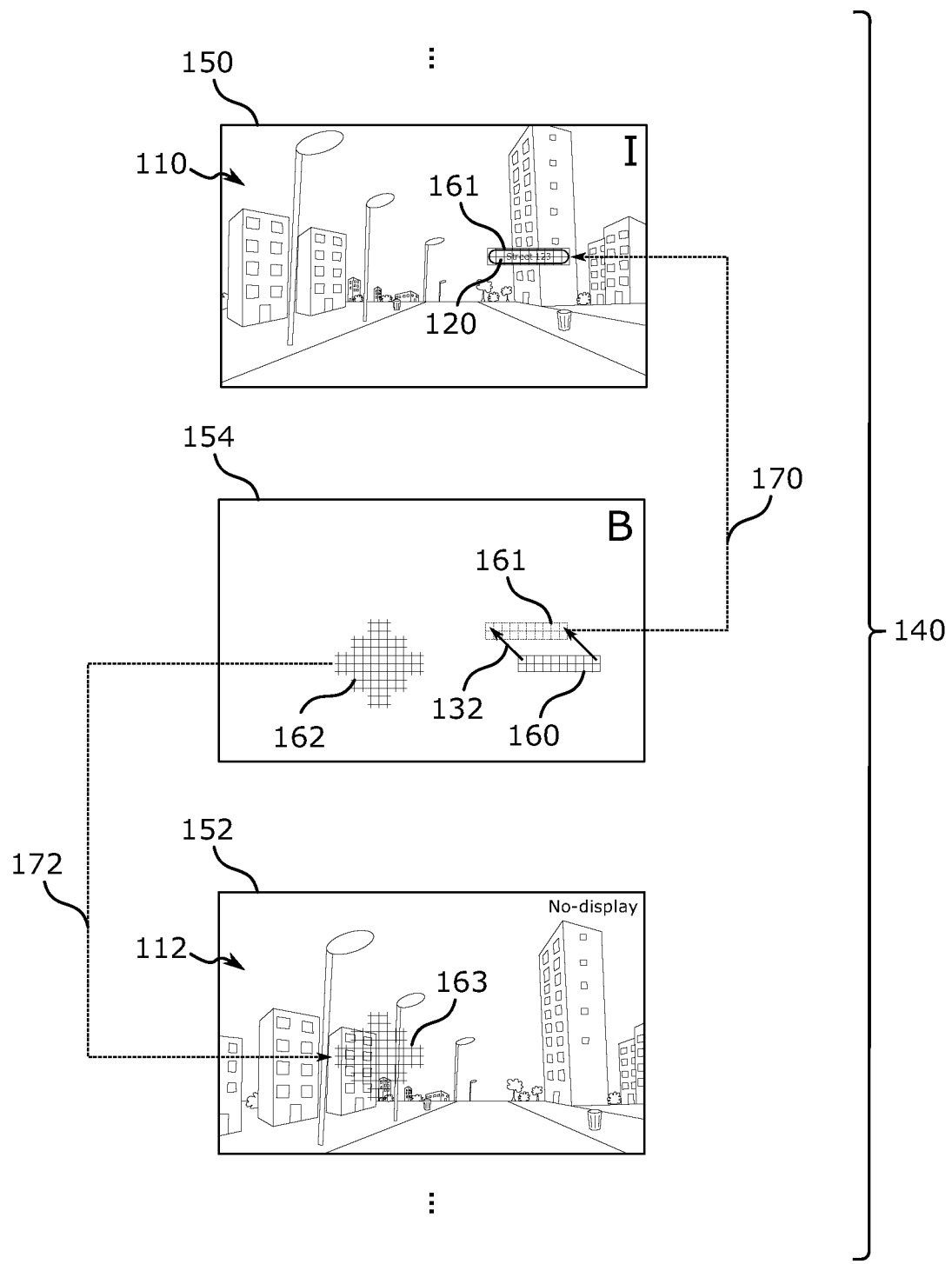

FIG. 1D schematically illustrates another possible example of how the method 200 may operate to encode the video stream 140 and the overlay 120. The various steps S201-S206 are here the same as those described with reference to FIG. 1C, but with the difference that the software-generated second frame 152 is instead added after the third frame 154. The third frame 154 is here a so-called B-frame, which now includes a reference to a "future frame" (the second frame 152), as the second frame 152 which includes the macroblocks which the third frame 152 is supposed to copy directly from (due to the macroblocks 162 of the third frame 152 being skip-macroblocks referencing 172 the macroblocks 163 of the second frame 152). As before, the third frame 154 also includes a reference 170 to previous first frame 150, in order to, in combination with the motion vector(s) 132, properly copy and process the macroblocks 161 of the first frame 150 where the overlay 120 was found in the first image 110.

Figure 3A:
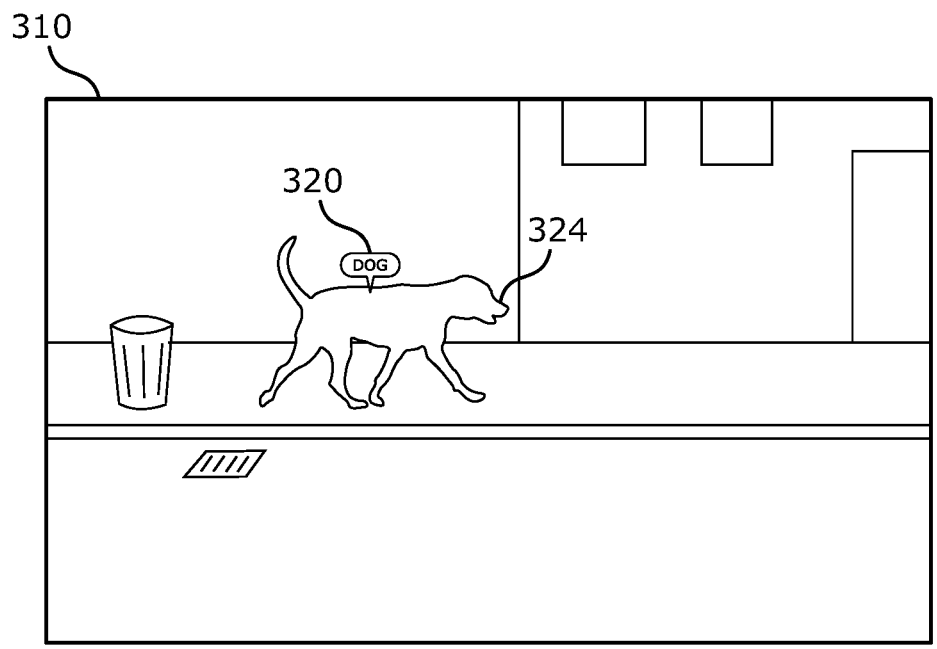
FIGS. 3A-3C schematically illustrate additional examples of how a method according to the present disclosure is used to encode a video stream including an overlay, and FIG. 4 schematically illustrate an embodiment of a device according to the present disclosure.

Another situation in which the method 200 as envisaged herein can operate will now be described with reference to FIGS. 3A-3C. The procedure that is followed is the same as the procedure described earlier with reference to FIGS. 1A-1D, but for a different kind of scene and camera setup. FIG. 3A schematically illustrates a scene captured by a stationary camera, in a first image 310 depicting a sidewalk of a street. In this scene, the particular object for which an overlay 320 is provided is a non-stationary, moving object in form of a dog 324. The overlay 320 here identifies the type of animal as a "dog", but may of course provide other information considered useful to the user viewing the scene through the video stream. As the dog 324 is moving/walking along the sidewalk, its position will change between captured images, and the overlay has to be updated accordingly in order for the overlay to stay fixed relative to the object/dog 324.

Figure 3B:
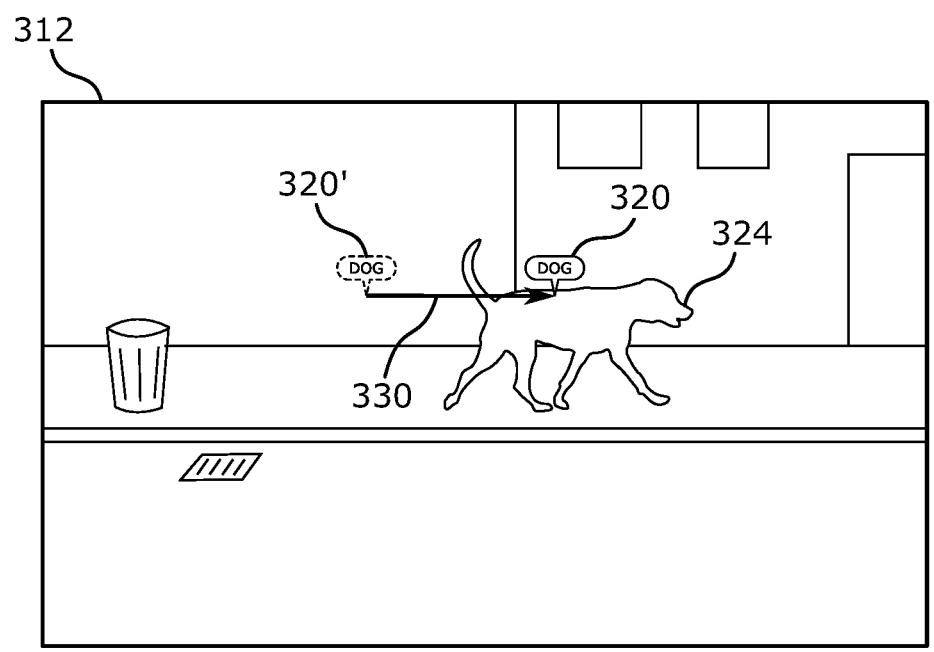
Figure 3C:
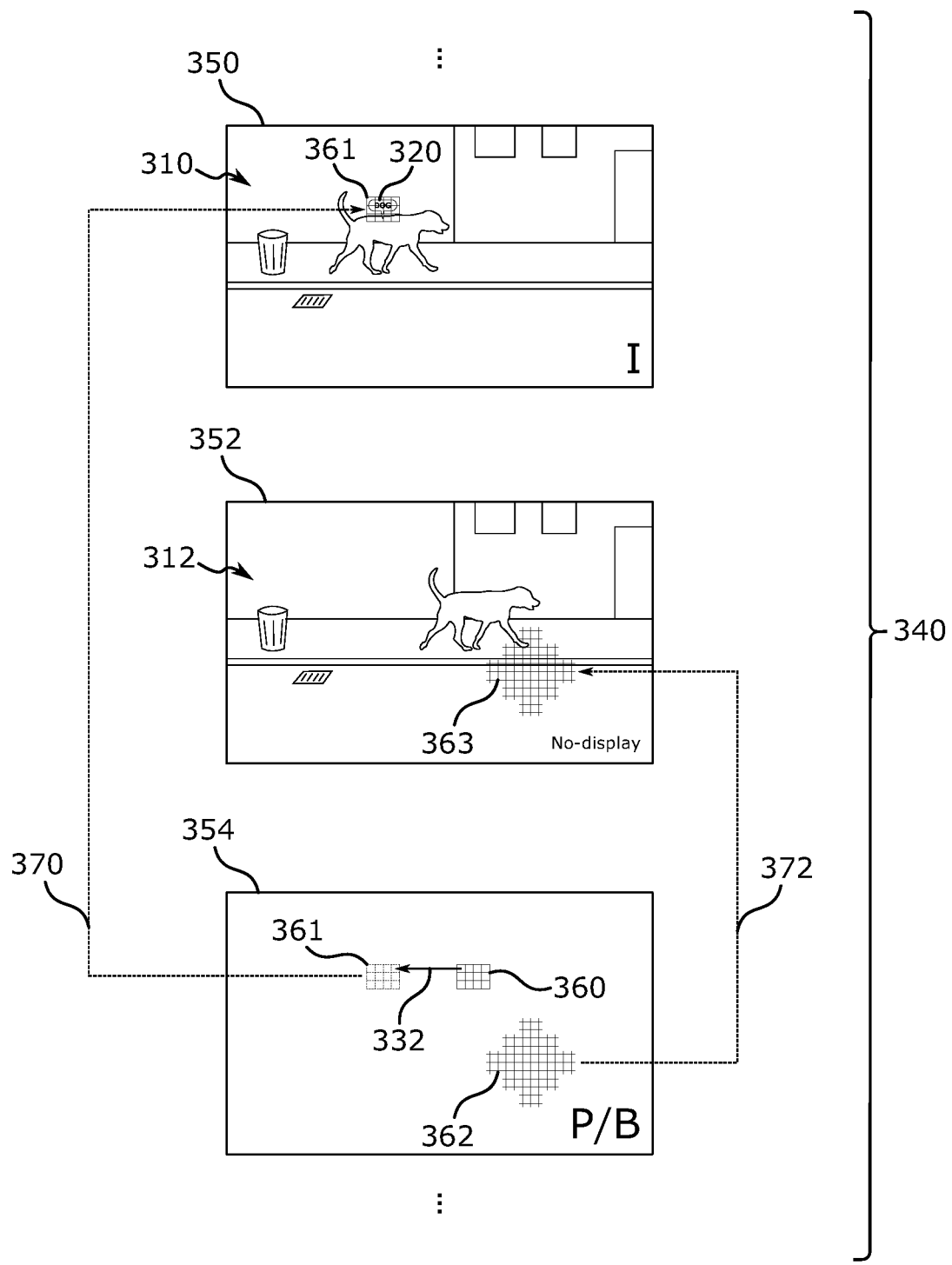

FIG. 3B illustrates a captured second image 312 depicting the same scene, but where the position of the dog 324 has changed since capturing the first image 310, as illustrated by the arrow 330. Consequently, a desired position of the overlay 320 in the second image 312 is thus different from a position of the overlay (here illustrated by the overlay 320') in the first image 310.

As explained earlier, the method 200 may here proceed by first capturing (in a step s201) the first image 310, render/add (in a step S202) the overlay 320 and encode the result as part of a first frame 350 of an encoded video stream 340. The method 200 may then proceed with capturing (in a step S203) the second image 312 of the scene, and the method 200 may then determine (in a step S204) a difference between the desired position of the overlay 320 in the second image 312 and the position of the overlay 320 in the first image 310. The method 200 may encode (in a step S205) this second image 312 as part of a second frame 352 (marked as a no-display frame), not including the overlay 320, and then continue to generate (using e.g., software) and encode (in a step S206) a third frame 354 with temporally predicted macroblocks 360 referencing 370 macroblocks 361 of the first frame 350 at the position of the overlay 320 in the first image 310, with the help of one or more motion vectors 332 based on the difference between the desired position of the overlay 320 in the second image 312 and that in the first image 310, and with one or more skip-macroblocks 362 referencing 372 one or more macroblocks 363 of the second, no-display frame 352 just as described earlier with reference to FIGS. 1C and 1D. Consequently, the method may perform as desired both when the desired position of an overlay in an image has changed due to a change/movement of the camera (such as e.g., a change of a FOV of the camera), when the desired position of an overlay in an image changes due to a movement of an object (with which the overlay is associated) in the scene, and or when the desired position changes due to a combination of both the camera changing and the object moving in the scene. Phrased differently, the method as disclosed and envisaged herein can function both when the overlay is fixed relative to the scene, and for example when the overlay is fixed relative to an object which is moving in the scene.

Herein, it is envisaged that the method 200 may be performed by for example a monitoring camera used to capture the images of the scene, or e.g., in any other suitable component of a (monitoring) camera system including such a monitoring camera. The method 200 may of course also be performed in any other device which has the capability to at least receive the captured first and second images, and to generate the various frames and encode the video stream as an output. An example of such a device as envisaged herein will now be described in more detail with reference to FIG. 4.

Figure 4:
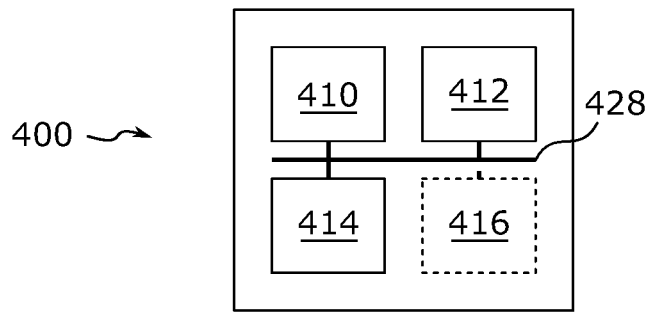

FIG. 4 schematically illustrates a device 400 for encoding a video stream including an overlay. The device 400 includes at least a processor (or "processing circuitry") 410 and a memory 412. As used herein, a "processor" or "processing circuitry" may for example be any combination of one or more of a suitable central processing unit (CPU), multiprocessor, microcontroller (µC), digital signal processor (DSP), application-specific integrated circuit (ASIC), field-programmable gate-array (FPGA), graphics processing unit (GPU), etc., capable of executing software instructions stored in the memory 412. The memory 412 may be external to the processor 410, or may be internal to the processor 410. As used herein, a "memory" may be any combination of random-access memory (RAM) and read-only memory (ROM), or any other kind of memory capable of storing the instructions. The memory 412 contains (i.e., stores) instructions that, when executed by the processor 410, cause the device 400 to perform a method as described herein (i.e., the method 200 or any embodiments thereof). The device 400 may further include one or more additional items 414 which may, in some situations, be necessary for performing the method. In some example embodiments, the device 400 may for example be a monitoring camera as mentioned above, and the additional item(s) 414 may then include e.g., an image sensor and for example one or more lenses for focusing light from a scene on the image sensor, such that the monitoring camera may capture images of the scene as part of performing the envisaged method. The additional item(s) 414 may also include e.g., various other electronics components needed for capturing the scene, e.g., to properly operate the image sensor and/or lenses as desired. Performing the method in a monitoring camera may be useful in that the processing is moved to "the edge", i.e., closer to where the actual scene is captured compared to if performing the processing and video encoding somewhere else (such as at a more centralized processing server or similar). The device 400 may for example be connected to a network such that the encoded video stream resulting from performing the method may be transmitted to a user. For this purpose, the device 400 may include a network interface 416, which may be e.g., a wireless network interface (as defined in e.g., any of the IEEE 802.11 or subsequent standards, supporting e.g., Wi-Fi) or a wired network interface (as defined in e.g., any of the IEEE 802.3 or subsequent standards, supporting e.g., Ethernet). The network interface 416 may for example also support any other wireless standard capable of transferring encoded video, such as e.g., Bluetooth or similar. The various components 410, 412, 414 and 416 (if present) may be connected via one or more communication buses 428, such that these components may communicate with each other, and exchange data as required.

The device 400 may for example be a monitoring camera mounted or mountable on a building, e.g., in form of a PTZ-camera or e.g., a fisheye-camera capable of providing a wider perspective of the scene, or any other type of monitoring/surveillance camera. The device 400 may for example be a body camera, action camera, dashcam, or similar, suitable for mounting on persons, animals and/or various vehicles, or similar. The device 400 may for example be a smartphone or tablet which a user can carry and film interesting scenes in order to get further information from the one or more overlays. The device 400 may also for example be, or include, a virtual headset or similar which the user can wear in order to observe the scene via the video stream. In any such examples of the device 400, it is envisaged that the device 400 may include all necessary components (if any) other than those already explained herein, as long as the device 400 is still able to perform the method 200 or any embodiments thereof as envisaged herein.

Although not described in any further detail herein, it is envisaged that the device 400 (such as e.g., a camera) may also have the capability to e.g., identify one or more objects in a scene, such as people, buildings, streets, vehicles, animals, tourist attractions or similar, and to generate appropriate overlays for such objects to provide the user with useful information. The identification of objects may for example be performed based on machine learning algorithms and/or e.g., position information obtained from e.g., a GPS receiver (which may be) included in the device 400.

Figure 2B:
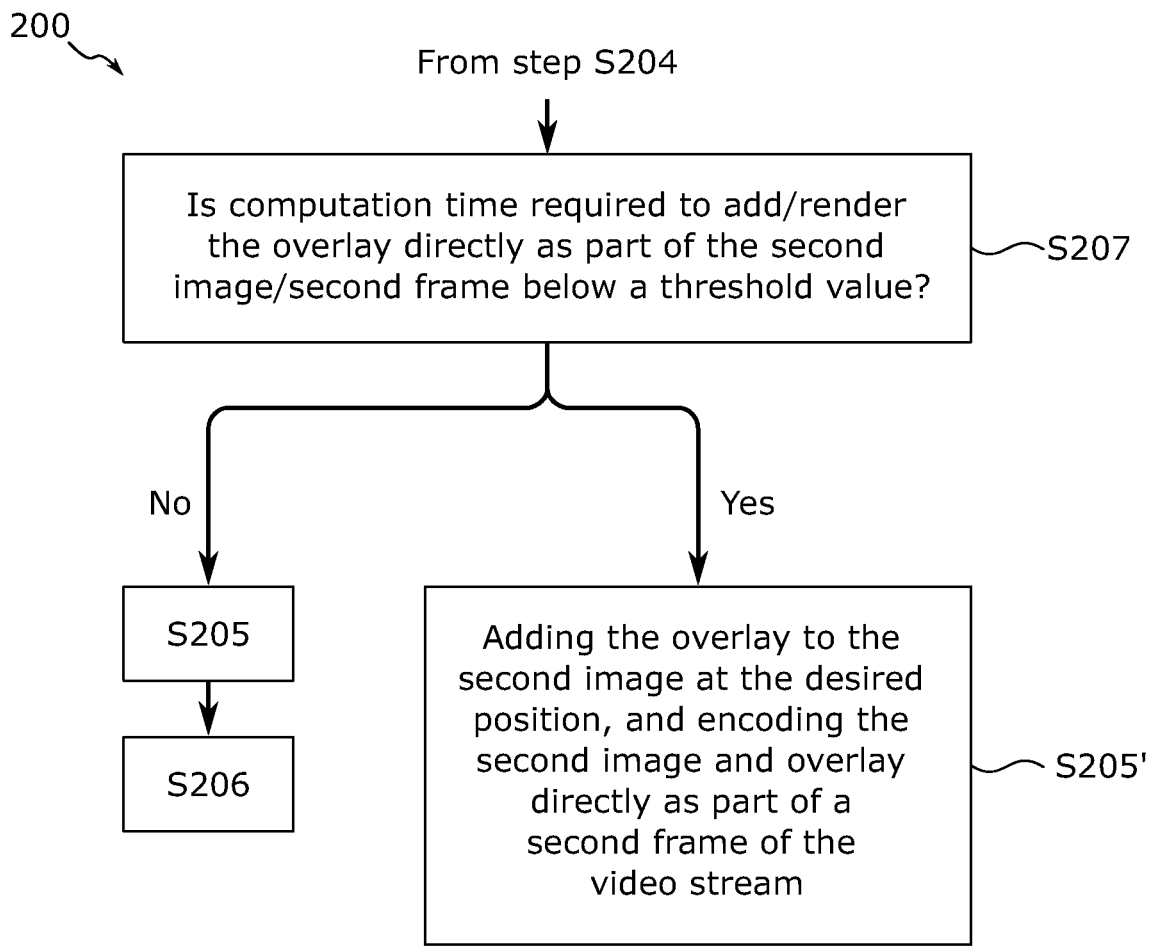

Another alternative embodiment of the method 200 will now be described with reference to FIG. 2B. FIG. 2B schematically illustrates an alternative procedure followed by the method 200 after the step S204. In a step S207 (not necessarily performed after step S204), it is decided whether a computation time required to instead add/render the overlay directly as part of the second image/second frame is below a threshold value. Phrased differently, step S207 includes estimating whether there are enough computational resources available, such that the overlay may be re-rendered as usual (i.e., as traditionally done) after the camera and/or object in the scene has moved or changed. If the estimated computation time is below the threshold (where the threshold is e.g., lower if little computational resources are available, and higher if more computational resources are currently available), the method may then (instead of proceeding to steps S205 and S206 as described with reference to FIG. 2A) proceed to a step S205' wherein the overlay is (directly) added/rendered to the second image at the desired position, and then (directly) encoded as part of a second frame of the video stream. Here, the second frame is not marked as a no-display frame, and the generation of the third frame referencing the first and second frames may be skipped. On the other hand, if it is determined that the computational resources available are not sufficient to perform such direct re-rendering of the overlay in the second image in time, the method 200 may proceed, as discussed earlier, to steps S205 and S206.

By using the alternative example of the method 200 described with reference to FIG. 2B, the normal re-rendering of an overlay upon change of e.g., the camera and/or object in the scene can be replaced by the envisaged utilization of a second no-display frame and the software-generated (and -inserted) third frame only when needed. This has the benefit of e.g., an improved image quality, as the normal re-rendering after movement/change of the camera and/or object usually results in a better visual experience as e.g. any perspective changes of the scene occurring between the capturing of the first and second images are then also considered.

The threshold value described above may for example be continuously updated based on a current loading of e.g., a processor or other processing circuitry used in the device (such as a monitoring camera) responsible for outputting the encoded video stream. For example, if the device is heavily occupied with other resource-intensive tasks (such as tracking multiple objects in the scene, or similar), the envisaged method utilizing the second no-display frame and the software-generated (and -inserted) third frame can provide a faster way of updating the position of the overlay such that it stays fixed with respect to e.g., the scene or a particular object in the scene, with acceptable visual quality. Such a check of the available computational resources and load can be performed e.g., multiple times per second, or at any desired interval. Thus, the envisaged method may be used as a backup in cases where normal re-rendering of the overlay is not possible.

As generally envisaged herein, the desired position of the overlay in the second image may be obtained/determined e.g., by knowing its position in the first image, and by also knowing e.g., how the camera has changed with respect to zoom-level, pan, tilt, etc. between capturing of the first and second images. The difference between the desired position in the second image and the position of the overlay in the first image can thus be calculated based on such information from the camera. If the camera is not mounted to a stationary object such as e.g., a building, additional information may be required in order to determine how the orientation and position of the camera has changed. It is envisaged that if needed, such additional information may be obtained from one or more suitable sensors mounted e.g., on the camera itself, and/or on whatever non-stationary object the camera is mounted to. In other embodiments, it is envisaged as being possible to find the desired position in the second image (and the corresponding difference to the first image, and the corresponding motion vector(s)) by identifying the correct location of the overlay in the second image using e.g., one or more image/video analysis algorithms, such as e.g., those for object detection and/or tracking.

In summary of the various embodiments presented herein, the present disclosure provides an improved way of providing (and updating a position of) an overlay in an encoded video stream where a position of the overlay in the images of the scene needs to be updated. The envisaged solution overcomes the problem of potentially having insufficient computational resources available to finish a re-rendering of the overlay for each such time. By marking the second frame as a no-display frame, and instead inserting a software-generated third frame referencing this second frame, image information about the scene in areas where the overlay is not supposed to be located can be provided to the third frame from the second frame by a simple copy-operation. Likewise, by also referencing the first frame from the third frame, image information about the overlay itself can be provided to the third frame by copying this information from the last frame wherein the overlay was properly rendered, i.e., from the first frame (using, of course, suitable motion vectors provided based on how the camera and/or object in the scene has changed/moved). Consequently, the third frame (including the overlay at the new, desired position) can be generated by an encoder by just referring to already available information in other frames, and thus lead to reduced computational time needed for preparing and encoding the third frame without any need to re-render the overlay at its new position in the second image. Similarly, a corresponding decoder is not affected by the method, and can proceed as usual by copying the information from the other frames as instructed by the encoded video stream output from the envisaged method. Phrased differently, currently available encoders supporting the concepts of motion vectors, temporally predicted frames, no-display frames, etc., can be used without modification. The method can also be performed using already available encoders without modification of these, as the third frame can be generated manually (using software) and just inserted into (or combined with) the output from such encoders to generate the encoded video stream as envisaged herein.

Although features and elements may be described above in particular combinations, each feature or element may be used alone without the other features and elements or in various combinations with or without other features and elements. Additionally, variations to the disclosed embodiments may be understood and effected by the skilled person in practicing the claimed disclosure, from a study of the drawings, the disclosure, and the appended claims.

In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

LIST OF REFERENCE NUMERALS 110, 310 first image of a scene
112, 312 second image of a scene
120, 320 overlay
120', 320' position of overlay in first image
124, 324 particular object in scene with which overlay is associated
130, 330 movement of position of overlay
132, 332 motion vector(s)
140, 340 video stream
150, 350 first (image) frame
152, 352 second (image) frame
154, 354 third (image) frame
160, 360 temporally predicted macroblocks in third frame
161, 361 source macroblocks in first frame
162, 362 skip-macroblocks in third frame
163, 363 source macroblocks in second frame
170, 370 reference to source macroblocks in first frame
172, 372 reference to source macroblocks in second frame
200 method (flowchart)
S201-S206 method steps
S205', s207 alternative method steps
400 device
410 processor/processing circuitry
412 memory
414 network interface
416 additional item(s)
428 communication bus(es)

The invention claimed is:

1. A method of encoding a video stream including an overlay, comprising:
   a) capturing a first image of a scene;
   b) adding an overlay to the first image at a first position, and encoding the first image as part of a first frame of an encoded video stream;
   c) capturing a second image of the scene;
   d) calculating a desired change in position of the overlay between a desired position of the overlay in the second image and the position of the overlay in the first image based on at least one of: i) information about a known change of a camera field-of-view between capturing the first image and the second image; ii) information about a known change of a camera position between capturing the first image and the second image, and iii) a known change in position of an object with which the overlay is associated in the scene between capturing the first image and the second image, using an object detection and/or tracking algorithm;
   e) encoding the second image as part of a second frame of the video stream, including marking the second frame as a no-display frame; and
   f) generating and encoding a third frame of the video stream, including one or more macroblocks of the third frame at the desired position of the overlay being temporally predicted macroblocks referencing the first frame, including one or more macroblocks of the third frame outside of the desired position of the overlay being skip-macroblocks referencing the second frame of the video stream, and including calculating motion vectors of the one or more temporally predicted macroblocks based on the desired change in position of the overlay.

2. The method according to claim 1, the third frame being a predicted frame, P-frame, or bi-directional predicted frame, B-frame, inserted after the second frame in the encoded video stream.

3. The method according to claim 1, the third frame being a bidirectional predicted frame, B-frame, inserted before the second frame in the encoded video stream.

4. The method according to claim 1, including capturing the first image and the second image using a same camera.

5. The method according to claim 1, the method being performed in a camera used to capture the first image and/or the second image.

6. The method according to claim 1, the overlay being fixed relative to the scene.

7. The method according to claim 1, further comprising estimating a computational time needed to render and encode the overlay as part of the second image and the second frame and, if determining that the estimated computational time is below a threshold value, performing steps a)-d) but not steps e) and f) and instead, after step d):

e') adding the overlay to the second image at the desired position, and encoding the second image as part of a second frame of the video stream.

8. A device for encoding a video stream including an overlay, comprising:
a processor, and
a memory storing instructions that, when executed by the processor, cause the device to:
capture a first image of a scene;
add an overlay to the first image at a first position, and encode the first image as part of a first frame of an encoded video stream;
capture a second image of the scene;
calculate a desired change in position of the overlay between a desired position of the overlay in the second image and the position of the overlay in the first image based on at least one of: i) information about a known change of a camera field-of-view between capturing the first image and the second image; ii) information about a known change of a camera position between capturing the first image and the second image, and iii) a known change in position of an object with which the overlay is associated in the scene between capturing the first image and the second image, using an object detection and/or tracking algorithm;
encode the second image as part of a second frame of the video stream, including to mark the second frame as a no-display frame; and
generate and encode a third frame of the video stream, wherein one or more macroblocks of the third frame at the desired position of the overlay are temporally predicted macroblocks referencing the first frame, and wherein one or more macroblocks of the third frame outside of the desired position of the overlay are skip-macroblocks referencing the second frame of the video stream, including to calculate motion vectors of the one or more temporally predicted macroblocks based on the desired change in position of the overlay.

9. The device according to claim 8, wherein the device is a monitoring camera configured to capture at least one of the first image and the second image.

10. A non-transitory computer readable storage medium having stored thereon computer program for encoding a video stream including an overlay, configured to, when executed by a processor of a device, cause the device to:
capture a first image of a scene;
add an overlay to the first image at a first position, and encode the first image as part of a first frame of an encoded video stream;
capture a second image of the scene;
calculate a desired change in position of the overlay between a desired position of the overlay in the second image and the position of the overlay in the first image based on at least one of: i) information about a known change of a camera field-of-view between capturing the first image and the second image; ii) information about a known change of a camera position between capturing the first image and the second image, and iii) a known change in position of an object with which the overlay is associated in the scene between capturing the first image and the second image, using an object detection and/or tracking algorithm;
encode the second image as part of a second frame of the video stream, including to mark the second frame as a no-display frame; and
generate and encode a third frame of the video stream, wherein one or more macroblocks of the third frame at the desired position of the overlay are temporally predicted macroblocks referencing the first frame, and wherein one or more macroblocks of the third frame outside of the desired position of the overlay are skip-macroblocks referencing the second frame of the video stream, including to calculate motion vectors of the one or more temporally predicted macroblocks based on the desired change in position of the overlay.

* * * * *